United States Patent [19]

Edagawa et al.

[11] Patent Number: 5,042,039

[45] Date of Patent: Aug. 20, 1991

[54] ER-DOPED OPTICAL FIBER LASER DEVICE

[75] Inventors: Noboru Edagawa, Tokyo; Kiyofumi Mochizuki, Hachioji; Hiroharu Wakabayashi, Kawasaki, all of Japan

[73] Assignee: Kokusai Benshin Kabushiki Kaisha, Tokyo, Japan

[21] Appl. No.: 452,806

[22] Filed: Dec. 19, 1989

[30] Foreign Application Priority Data

Dec. 22, 1988 [JP] Japan ................................. 63-321945

[51] Int. Cl.$^5$ ............................................... H01S 3/30
[52] U.S. Cl. ............................................. 372/6; 372/69; 372/70; 372/781; 359/341; 385/122; 385/123; 385/141
[58] Field of Search ......................... 372/6, 69, 70, 71; 350/96.15, 96.3, 96.34

[56] References Cited

U.S. PATENT DOCUMENTS

| | | | |
|---|---|---|---|
| 4,787,086 | 11/1988 | Dentai et al. | 372/6 |
| 4,835,778 | 5/1989 | Kafka et al. | 372/6 |
| 4,923,279 | 5/1990 | Ainslie et al. | 372/6 |

*Primary Examiner*—Georgia Epps
*Attorney, Agent, or Firm*—Emmanuel J. Lobato; Robert E. Burns

[57] ABSTRACT

An Er-doped optical fiber laser device adapted for pumping by light from a pumping light source in an erbium (Er)-doped optical fiber which enters a single mode at the wavelength of amplified light. In accordance with the present invention, the Er-doped optical fiber is further doped with at least one of holmium (Ho), thulium (Tm) and dysprosium (Dy). The pumping light source emits light in a 1.1 to 1.4 μm band. The output light from the pumping light source and signal light incident to the Er-doped optical fiber are combined by a combining optical fiber coupler.

3 Claims, 4 Drawing Sheets

ER-DOPED OPTICAL FIBER LASER DEVICE

BACKGROUND OF THE INVENTION

The present invention relates to an erbium (Er)-doped optical fiber laser device.

In optical communications there has heretofore been employed, for amplifying an optical signal of reduced intensity, a method which once converts the optical signal into an electric signal through a photodetector, amplifies the electric signal and then converts the amplified electric signal into a high-intensity optical signal by use of a semiconductor laser.

On the other hand, there has recently been proposed a so-called direct optical amplification (hereinafter referred to as "optical amplification") system which amplifies an optical signal as it is. Much study is being given for this system in many countries as an indispensable technique for future optical communications and photometry, because the system does not involve the photo-electrophoto conversion and hence permits an arbitrary selection or change of the bit rate and scimitareous amplification of wavelength multiplex and frequency multiplex optical signals.

There has been heretofore proposed an optical amplification method which employs, as an optical amplifier, optical fiber doped with a rare earth element. It has been ascertained that an optical amplifier capable of amplifying signal light of a 1.5 μm band in the range of 20 to 30 dB can be obtained by doping silica glass fiber with erbium (Er) which is one of rare earth elements (which amplifier will hereinafter referred to as an "Er-doped optical fiber laser amplifier"). Because of its various advantages such as a high saturated output level, low polarization dependence and a small noise figure, this optical amplifier is now being actively investigated as one of practical optical amplifiers in the future.

However, the conventional Er-dope optical fiber laser device for amplification or oscillation has defects of large size, low efficiency and low reliability because of a large difference between the oscillation (or amplification) wavelength in the 1.5 μm band and the wavelength of the pumping light source in the range of 0.5 to 1 μm.

SUMMARY OF THE INVENTION

An object of the present invention is to provide a small, high-efficiency and high-reliability Er-doped optical fiber laser device which obviates the above-mentioned defects of the prior art and enables the pumping light source to have a wavelength in the range of 1.1 to 1.4 μm.

To attain the above object of the present invention, an Er-doped optical fiber laser device of the present invention is adapted for pumping light from the pumping light source in the erbium (Er)-doped optical fiber which enters the single mode at the wavelength of amplified light. The Er-doped optical fiber laser device comprises: an Er-doped optical fiber further doped with at least one of holmium (Ho), thulium (Tm) and dysprosium (Dy); a pumping light source for emitting light of a wavelength in the 1.1 to 1.4 μm band; and combining means for mutually combining the output light from the pumping light source and signal light incident to the Er-doped optical fiber.

BRIEF DESCRIPTION OF THE DRAWINGS

The present invention will be described in detail below in comparison with prior art with reference to the accompanying drawings, in which.

DETAILED DESCRIPTION

To make differences between art and the present invention clear, prior art will first be described.

Figure 1:
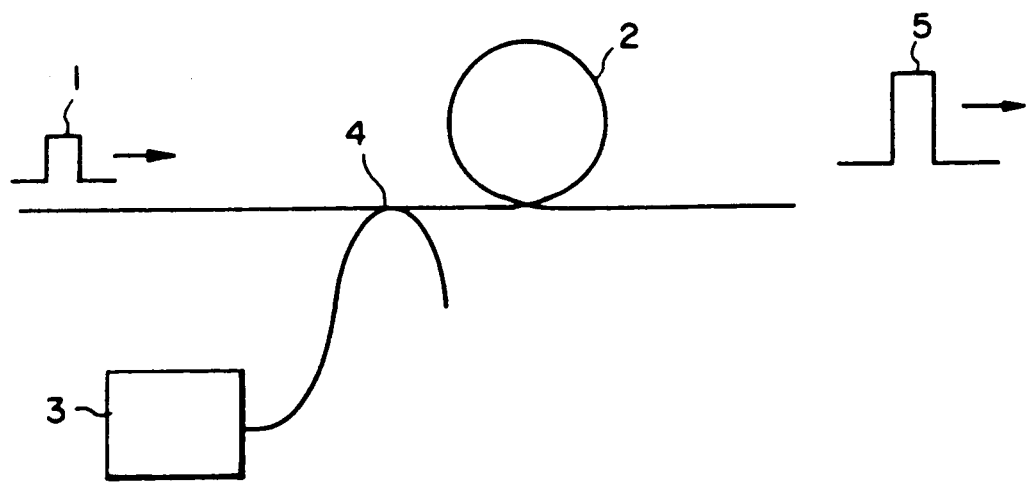
FIG. 1 is a schematic diagram of a conventional Er-doped optical fiber laser amplifier.

FIG. 1 is a schematic diagram of a conventional Er-doped optical fiber laser amplifier. Reference numeral 1 indicates input signal light, 2 an erbium (Er)-doped optical fiber which enters a single mode at the wavelength of amplified light, 3 a light source for optical pumping (hereinafter referred to as a pumping light source) which has an oscillation wavelength in a 0.5 to 1 μm band, 4 an optical fiber coupler for mutually combining the signal light 1 propagating in the Er-doped optical fiber 2 and pumping light from the pumping light source 3, and 5 amplified output light.

Figure 2:
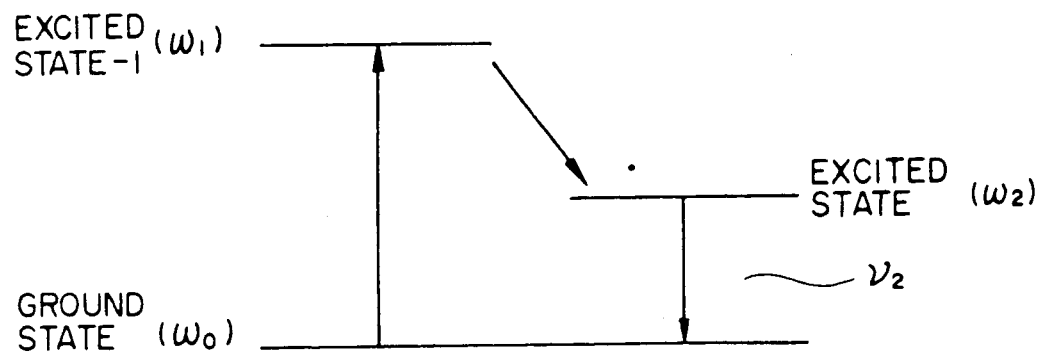
FIG. 2 is an energy state diagram for explaining the principle of the conventional Er-doped optical fiber laser amplifier.

The basic principle of operation of the Er-doped optical fiber laser amplifier can be considered in the same manner as is the case with an ordinary three-level laser, using the 4f shell electronic energy level of erbium (Er). As shown in FIG. 2, there are a ground state ($\omega_0$) and excited states 1 ($\omega_1$) and 2 ($\omega_2$), and by absorbing light of an energy ($\omega_1 - \omega_0$) corresponding to the energy level difference between the ground state ($\omega_0$) and the excited state 1 ($\omega_1$), electrons in the ground state are pumped to the excited state 1. The electrons thus pumped to the excited state 1 enters the excited state 2 by a nonradiative transition. By emitting light (having a frequency of $\nu_2 = (\omega_2 - \omega_0)/h$, where h is the Planck's constant) of an energy corresponding to the energy level difference between the ground state 1 and the excited state 2, the electrons in the excited state 2 return to the ground state. By applying light of the frequency $\nu_2$ at this time, the radiative transition from the excited state 2 to the ground state is induced by the incident light, permitting amplification of light of the frequency $\nu_2$. In the case of erbium (Er), the wavelength of light of the frequency $\nu_2$ is of the 1.5 μm band, so that the Er-doped optical fiber laser amplifier can be used as an optical amplifier in the 1.5 μm band. Furthermore, the Er-doped optical fiber laser amplifier with reflectors disposed at its both ends can be employed as an Er-doped optical fiber laser oscillator. The following description will be given of the Er-doped optical fiber laser amplifier.

Figure 3:
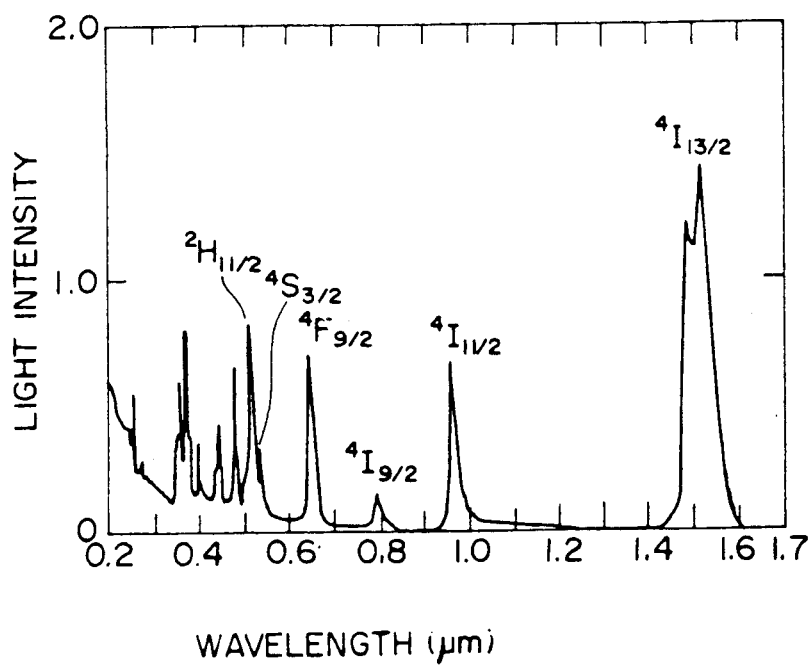
FIG. 3 is a graph showing the absorption spectrum of a conventional Er-doped optical fiber.

In the case of the Er-doped optical fiber, there are some excited states 1 which can be utilized for pumping, but their absorption lines are only below 1 μm as depicted in FIG. 3. Accordingly, the prior art uses the absorption line of the erbium (Er) for pumping and encounters the following problems, because the wavelength of the pumping light source is 0.5 to 1 μm.

1) It is necessary to use, as the pumping light source, a laser light source which oscillates at the same wavelength as that of the absorption line. The pumping light sources now in use are, for instance, an Ar laser which oscillates in the 0.5 μm band, various dye lasers which oscillate in 0.6, 0.8 and 0.9 μm bands, and a GaAs semiconductor laser which oscillates in the 0.8 μm band. From the practical viewpoint of the optical amplifier implementation, however, it is undesirable, to employ, as the pumping light source, such a large laser as the Ar laser or dye laser. Moreover, the reliability of GaAs semiconductor lasers cannot be approved to be high enough as a pumping light source of an optical fiber laser amplifier particularly for optical communications. For practical application of the optical fiber laser amplifier, it is therefore necessary to develop a small, highly efficient and highly reliable pumping light source.

2) The wavelength of pumping light is shorter than 1 μm, whereas the wavelength of amplified light is in the 1.5 μm band; thus, the wavelength difference is so great that it is very difficult to match the propagation modes of the pumping light with the amplified light in the Er-doped optical fiber which goes into the single mode at the wavelength of the amplified light. Consequently, the amplification efficiency may sometimes be lowered by mismatching of the propagation modes.

3) In the case of mutually combining the pumping light and the amplified light, fusion splicing of an optical fiber coupler to the Er-doped optical fiber is very effective for reducing the reflectivity at the terminal of the amplifier. Since the pumping light and the amplified light largely differ from each other in wavelength, however, it is difficult to obtain an optical fiber coupler which operates stably irrespective of ambient temperature changes, mechanical deformation and external force and performs the single-mode operation for the amplified light.

With reference to the accompanying drawings, the present invention will hereinafter be described in detail. While the present invention will be described as being applied to an Er-doped optical fiber laser amplifier, the invention is applicable as well to an Er-doped optical fiber laser oscillator.

Figure 4:
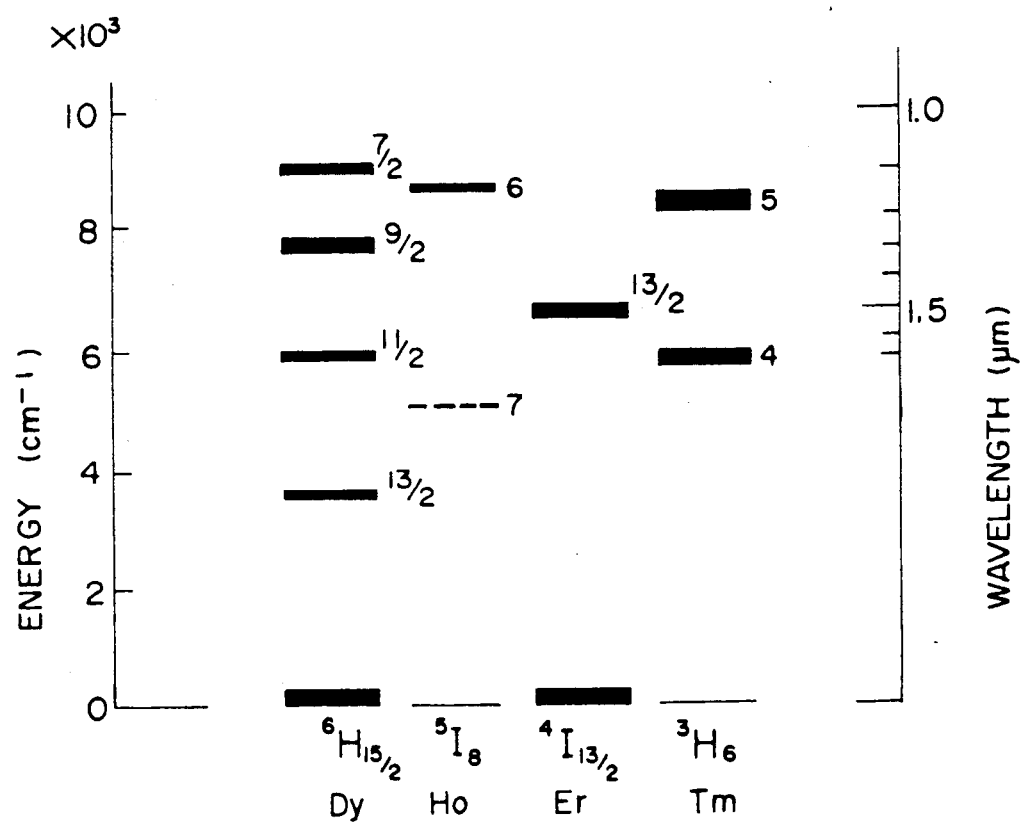
FIG. 4 is a graph showing 4f shell electronic energy levels of holmium (Ho), thulium (Tm) and dysprosium (Dy) which are related to their optical absorption and emission.

FIG. 4 shows 4f shell electronic energy levels of holmium (Ho), thulium (Tm) and dysprosium (Dy) which are related to the absorption and emission of light (almost in the 1.1 to 1.4 μm band). Symbol (H, I) indicates the total orbital angular momentum, the numeral at the upper left of the symbol indicates a quantity represented by (2S+1), where S is the quantum number of the total spin angular momentum, numerals lower right of the symbol and at the right of each line each indicate the quantum number of the total angular momentum, and the thickness (or width) of the line represents the bandwidth which is determined by splitting of the energy level. $^6H_{15/2}$, $^5I_8$, $^4I_{15/2}$ and $^3H_6$ represent the energy levels of the dysprosium (Dy), holmium (Ho) and thulium (Tm), respectively, and this energy is used as a reference (zero) to represent energy on the ordinate. Incidentally, FIG. 4 shows the case of fluoride glass being doped with the above-mentioned elements, and their energy levels somewhat vary with the medium to be doped with them.

Figure 5:
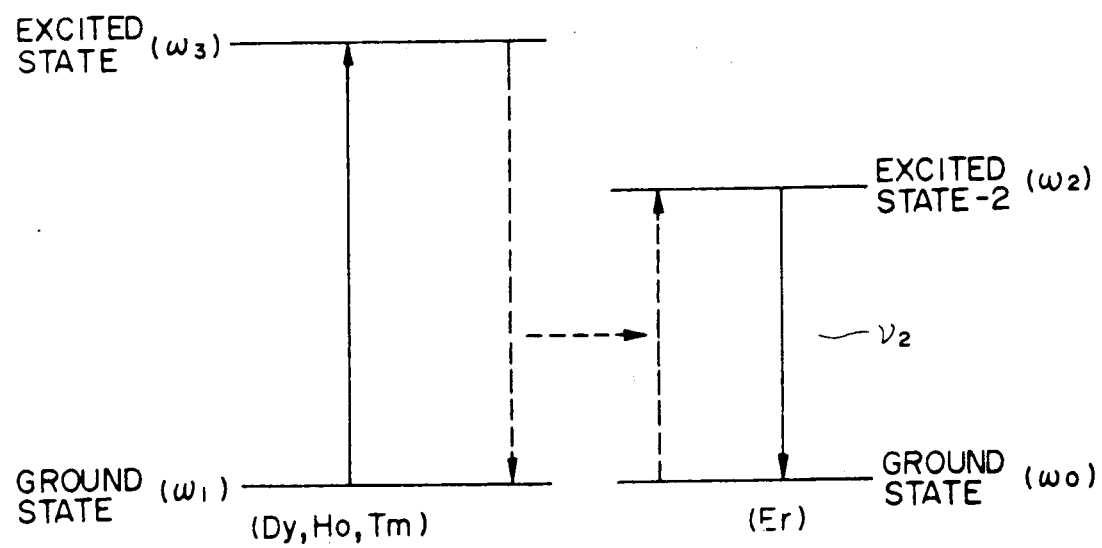
FIG. 5 is a schematic diagram showing the energy levels explanatory of the process of optical amplification by the present invention.

FIG. 5 is a schematic energy level diagram for explaining the process of optical amplification.

A description will be given, with reference to FIGS. 4 and 5, of the reason for which the pumping light source emits light in the 1.1 to 1.4 μm band by doping an optical fiber with erbium (Er) and at least one of holmium (Ho), thulium (Tm) and dysprosium (Dy), which is characteristic of the present invention.

In FIG. 5, a notation $\omega_0$ indicates the energy level of the erbium (Er) in the ground state, $\omega_1$ the energy level of the dysprosium (Dy), holmium (Ho) or thulium (Tm) in the ground state, $\omega_2$ the energy level of the erbium (Er) in the excited state, and $\omega_3$ the energy level of the dysprosium (Dy), holium (Ho) or thulium (Tm) in the excited state. The excited state $\omega_2$ corresponds to $^4I_{13/2}$ in FIG. 4, and the energy level difference, $\omega_2 - \omega_0$, corresponds to the energy for emitting light in the 1.5 μm band. The excited state $\omega_3$ corresponds to $^6H_{9/2}$ in the case of the dysprosium (Dy), $^5I_6$ in the case of the holium (Ho) and $^3H_5$ in the case of the thulium (Tm), and the energy level difference, $\omega_3 - \omega_1$, corresponds to the energy for absorbing light in the vicinities of 1.3, 1.15 and 1.2 μm bands, respectively. The width of the wavelength band in which efficient optical absorption occurs corresponds to the bandwidth (about $0 \leq 0.05$ μm) of the energy level. When the optical fiber doped with the erbium (Er) and the dysprosium (Dy), holmium (Ho), or thulium (Tm) is exposed to light of the 1.1 to 1.4 μm band corresponding to the wavelengths at which light is absorbed by the respective dopants, the incident light is absorbed at the absorption line of the dysprosium (Dy), holmium (Ho) or thulium (Tm), and electrons in the ground state $\omega_0$ are pumped to the excited state $\omega_3$. The electrons thus pumped to the excited state $\omega_3$ interacts with the neighboring erbium (Er) through a crystal field created by atoms near the erbium (Er), or interacts directly with the neighboring erbium (Er), by which electrons in the ground state $\omega_0$ are furnished with energy and pumped to the excited state $\omega_2$. By emitting light (of a frequency $\nu_2 = (\omega_2 - \omega_0)/h$, where the notation h is the Planck's constant) of an energy corresponding to the energy level difference between the ground state $\omega_0$ and the excited state $\omega_2$, the electrons in the excited state $\omega_2$ return to the ground state $\omega_0$. Applying thereto light of the frequency $\nu_2$ at this time, a radiative transition from the excited state $\omega_3$ to the ground state $\omega_0$ is induced by the incident light of the frequency $\nu_2$ can be amplified. In the case of the erbium (Er), since the wavelength of the light of the frequency $\nu_2$ is in the 1.5 μM band, the Er-doped optical fiber laser amplifier can be employed as an optical amplifier for use in the 1.5 μm band.

As described above, according to the present invention, the pumping light source of a wavelength in the range of 1.1 to 1.4 μm, which has been unobtainable with optical fiber doped with the erbium (Er) alone, can be implemented by doping with the dysprosium (Dy), holmium (Ho), or thulium (Tm). The doping concentrations of the dysprosium (Dy), the holmium (Ho) and the thulium (Tm) for producing the above effect range from 10 to 10000 ppm, and the effect is remarkable, in particular, when their doping concentrations are in the range of tens to hundreds of parts per million. Also in the case of doping two of the dysprosium (Dy), the holmium (Ho) and the thulium (Tm), their doping concentrations must be held in the above range.

While in the above the Er-doped silica optical fiber has been described to be an optical amplifier, the same pumping technique as mentioned above can also be applied to the case where the Er-doped optical fiber is employed as a laser oscillator.

As described above, by doping the conventional Er-doped optical fiber with at least one of the holmium (Ho), the thulium (Tm) and the dysprosium (Dy) in accordance with the present invention, a wavelength in the range of 1.1 to 1.4 μm can be used for the pumping light source. This produces the following effects:

1) A small-sized, high-efficiency and high-reliability InGaAsP-series semiconductor, which has already undergone to an appreciable development, can be utilized.

2) Since a difference between the wavelength of pumping light and the wavelength of amplified light is reduced, mismatching of the propagation modes of the pumping light with the amplified light decreases, and consequently, the amplification efficiency increases.

3) Because of the reduced wavelength difference between the pumping light and the amplified light, it is possible to employ an optical fiber which performs a stable single-mode operation for signal light and pumping light, irrespective of its bending and changes in environmental conditions such as temperature, and a stable optical fiber combining coupler can be fabricated with ease.

As will be appreciated from the above, the present invention is applicable to the fields of optical communications and photometry which utilize Er-doped optical fiber laser devices such as an Er-doped optical fiber laser amplifier and an Er-doped optical fiber laser oscillator. Hence the present invention is of great utility in practical use.

What we claim is:

1. An Er-doped optical fiber laser device receptive of a signal light input for pumping by light from a pumping light source in an erbium (E)r-doped optical fiber which enters a single mode at the wavelength of amplified light, characterized in:

that said Er-doped optical fiber is additionally doped with at least one of holmium (Ho), thulium (Tm) and dysprosium (Dy);

that said pumping light source emits light in a 1.1 to 1.4 μm band; and combining means for combining the output light from said pumping light source and signal light input to said Er-doped optical fiber.

2. An Er-doped optical fiber laser device according to claim 1, characterized in that said pumping light source comprises an InGaAsP-series semiconductor laser.

3. An Er-doped optical fiber laser device according to claim 1, characterized by the provision of a single-mode optical fiber connecting said pumping light source to said combining means.

* * * * *

UNITED STATES PATENT AND TRADEMARK OFFICE
CERTIFICATE OF CORRECTION

PATENT NO. : 5,042,039
DATED : Aug. 20, 1991
INVENTOR(S) : Edagawa et al

It is certified that error appears in the above-identified patent and that said Letters Patent is hereby corrected as shown below:

On the title page, column 1, item [73]

[73] Assignee: Kokusai Denshin Denwa Kabushiki Kaisha
Tokyo, Japan

Signed and Sealed this

Thirteenth Day of October, 1992

Attest:

DOUGLAS B. COMER

Attesting Officer   Acting Commissioner of Patents and Trademarks